United States Patent
Potter et al.

(10) Patent No.: US 9,127,760 B1
(45) Date of Patent: Sep. 8, 2015

(54) DIFFERENTIAL ASSEMBLY SHROUD MEMBER FOR SPIN LOSS REDUCTION

(71) Applicants: Kenneth J Potter, Almont, MI (US); Sandeep Makam, Auburn Hills, MI (US); Timothy R Schumaier, Farmington Hills, MI (US)

(72) Inventors: Kenneth J Potter, Almont, MI (US); Sandeep Makam, Auburn Hills, MI (US); Timothy R Schumaier, Farmington Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/265,751

(22) Filed: Apr. 30, 2014

(51) Int. Cl.
- F16H 57/02 (2012.01)
- F16H 48/40 (2012.01)
- F16H 57/04 (2010.01)

(52) U.S. Cl.
CPC ............ F16H 48/40 (2013.01); F16H 57/0409 (2013.01); F16H 57/0423 (2013.01); F16H 57/0483 (2013.01)

(58) Field of Classification Search
CPC . F16H 57/0483; F16H 57/02; F16H 57/0409; F16H 57/0421
See application file for complete search history.

(56) References Cited

U.S. PATENT DOCUMENTS

| | | | | |
|---|---|---|---|---|
| 3,838,751 A * | 10/1974 | Brown | | 184/6.12 |
| 5,813,493 A | 9/1998 | Sloan | | |
| 7,823,696 B2 * | 11/2010 | Baba | | 184/6.12 |
| 8,021,259 B2 | 9/2011 | Hilker | | |
| 2010/0043594 A1 * | 2/2010 | Hilker et al. | | 74/607 |
| 2011/0212805 A1 * | 9/2011 | Hilker et al. | | 475/160 |
| 2012/0295751 A1 * | 11/2012 | Okada | | 475/160 |

* cited by examiner

Primary Examiner — Tisha Lewis
(74) Attorney, Agent, or Firm — Ralph E. Smith

(57) ABSTRACT

An axle assembly for a vehicle includes an axle housing assembly having a carrier housing and a differential assembly mounted in the carrier housing for rotation about a rotational axis. In an exemplary implementation, the differential assembly includes a unitary differential case, a differential gear set and a shroud member. The differential case defines an interior cavity and a window having an outer perimeter, where the window is configured to provide access to the interior cavity for assembling the gear set into the interior cavity. The shroud member is configured to be removably coupled to the differential case to cover the window and provide a radiused contour aligning with a radiused contour of the differential case thereby reducing spin losses when the differential assembly is rotating relative to the axle housing assembly.

15 Claims, 9 Drawing Sheets

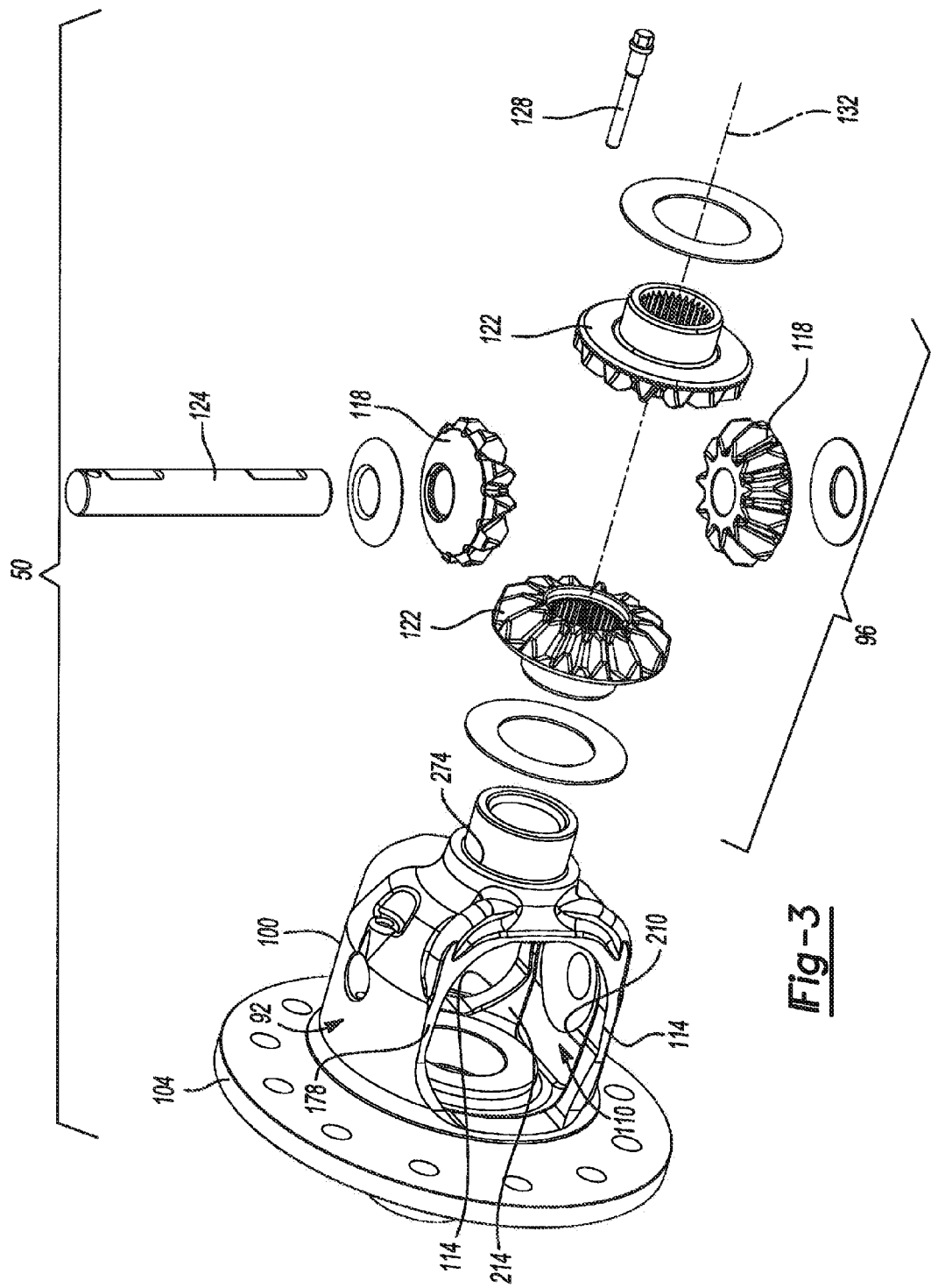

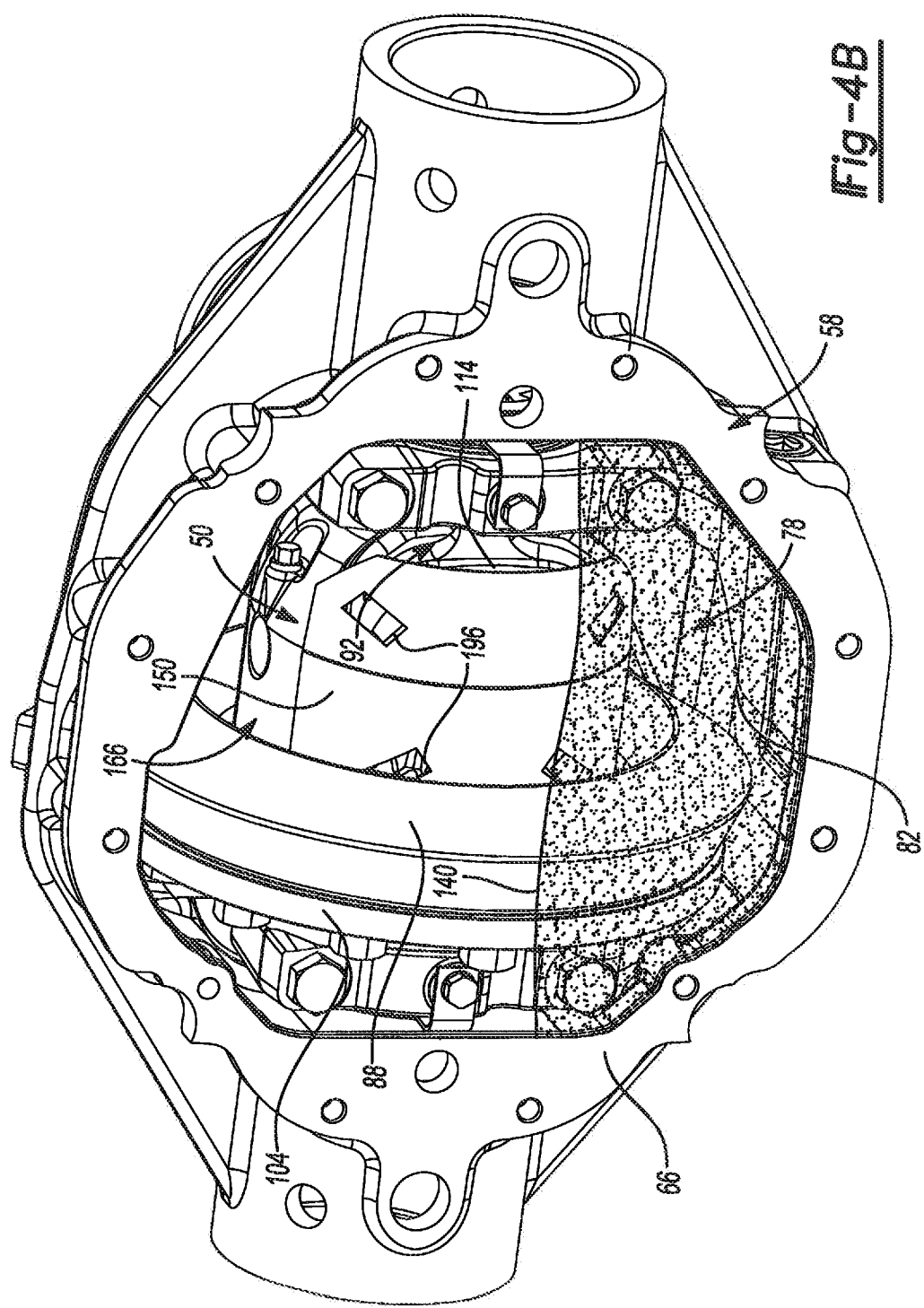

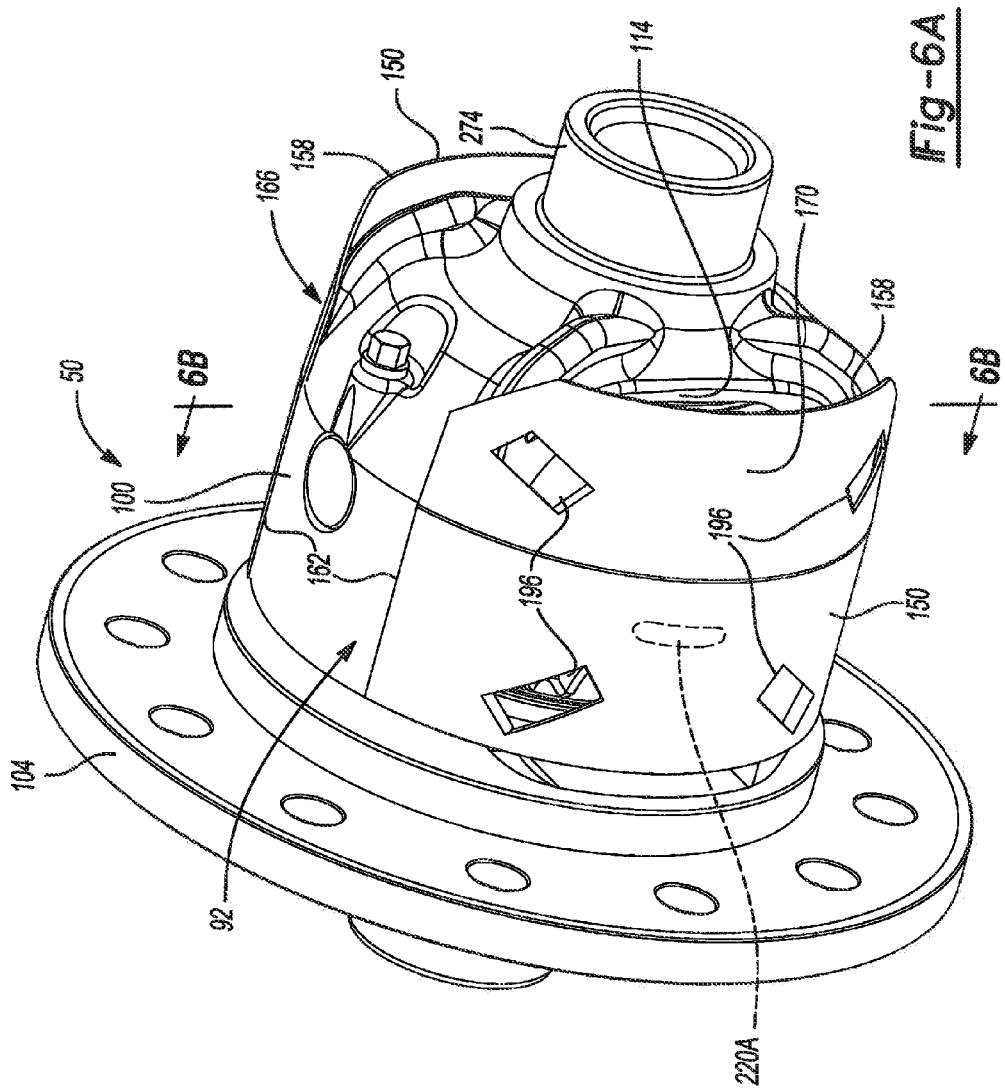

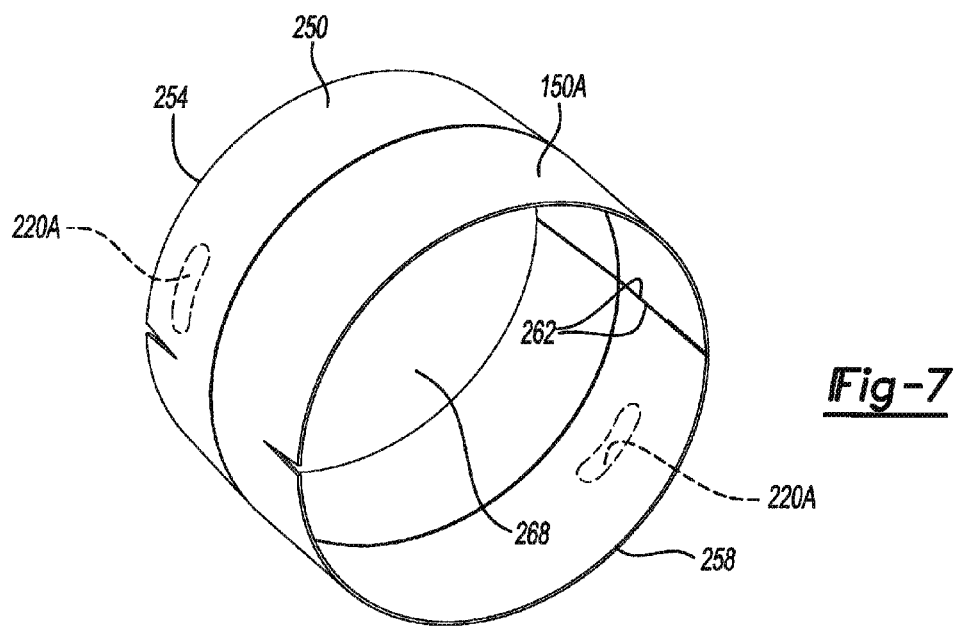
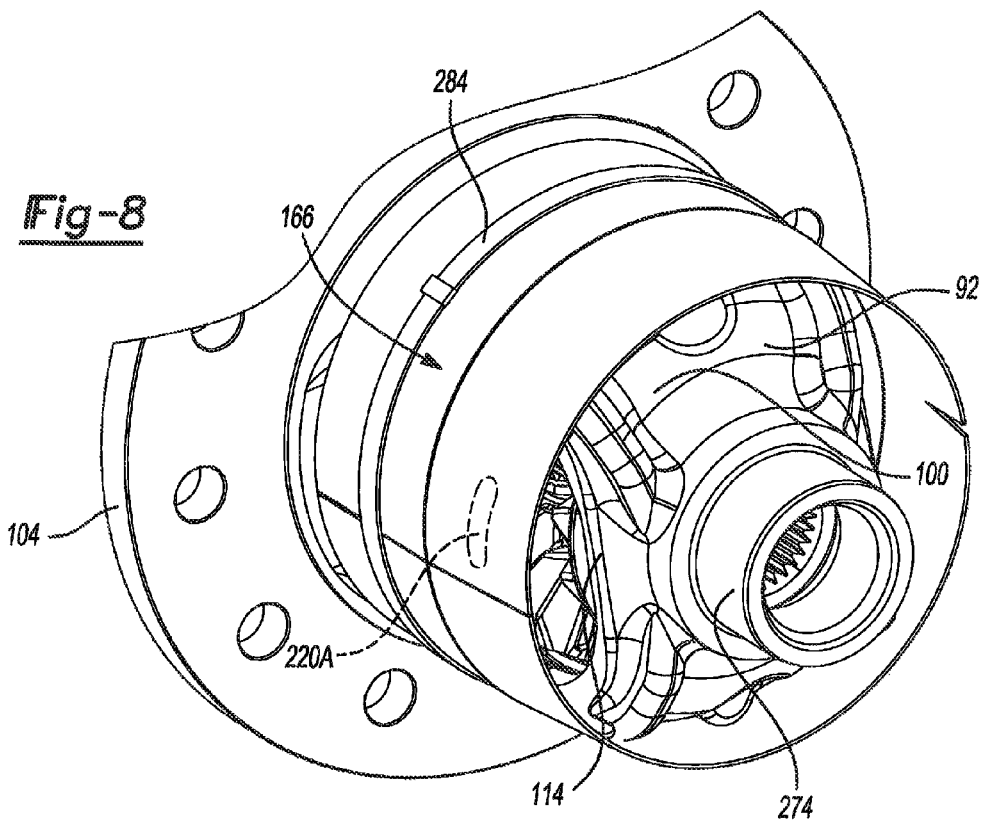

US 9,127,760 B1

DIFFERENTIAL ASSEMBLY SHROUD MEMBER FOR SPIN LOSS REDUCTION

FIELD

The present disclosure relates generally to a differential assembly for an axle assembly and, more particularly, to a differential assembly shroud member for spin loss reduction.

BACKGROUND

Modern vehicles typically include an axle assembly having a housing and a differential assembly. The housing includes a cavity into which the differential assembly is positioned and rotatably supported. The differential assembly includes a differential case into which a differential gear set is assembled. The differential case typically includes two windows to facilitate assembling the differential gear set therein. When the differential assembly is rotatably supported in the axle housing cavity, the differential case windows are at least partially submerged in the differential fluid. As a result, rotation of the differential assembly relative to the axle housing assembly causes high churning of the differential fluid by the differential case windows. Moreover, the differential case windows also cause windage losses. The differential fluid churning and windage losses result in axle assembly spin losses, which lowers the drivetrain efficiency and therefore the fuel efficiency of the associated vehicle. Thus, while conventional differential assemblies work for their intended purpose, there remains a need for improvement in the relevant art.

SUMMARY

In one aspect, an axle assembly for a vehicle is provided in accordance with the teachings of the present disclosure. In an exemplary implementation, the axle assembly includes an axle housing assembly having a carrier housing and a differential assembly mounted in the carrier housing for rotation about a rotational axis. The differential assembly includes a unitary differential case, a differential gear set and a shroud member. The differential case defines an interior cavity and a window having an outer perimeter, where the window is configured to provide access to the interior cavity for assembling the gear set into the interior cavity. The shroud member is configured to be removably coupled to the differential case to cover the window and provide a radiused contour aligning with a radiused contour of the differential case thereby reducing spin losses when the differential assembly is rotating relative to the axle housing assembly.

In some implementations, the window defined by the differential case includes a pair of windows defined by the differential case, and the shroud member includes a pair of distinct shroud members configured to be removably coupled to the differential case to cover the pair of windows. In these implementations, the shroud members are circumferentially spaced apart from each other. In some implementations, each shroud member includes an outer perimeter configured to substantially align with or overlap the outer perimeter of each window.

In some implementations, the differential case, with the pair of shroud members coupled thereto, includes a cylindrical exterior contour configured to reduce lubricant churning and windage losses when the differential assembly is rotating relative to the axle assembly. In some implementations, each shroud member comprises integral coupling members configured to engage the differential case about the respective window to removably couple the shroud members to the differential case.

In some implementations, the shroud member includes an annular clamshell shroud member defining a cylindrical exterior contour when in a closed configuration. In these implementations, the clamshell shroud member includes a flexible housing defining opposed circumferential ends configured to be spaced apart from each other in an open configuration so as to receive the differential case in an interior of the clamshell shroud member. The clamshell shroud member includes a diameter complimentary to a diameter of the differential case so as to encircle the differential case when coupled thereto and provide a cylindrical exterior contour for the differential case.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 3 is an exploded view of an exemplary differential assembly of the axle assembly of FIG. 2 according to the principles of the present disclosure;

FIG. 4B is a rear perspective view of the axle assembly of FIG. 2 illustrating the carrier housing with the cover removed and an exemplary shroud member associated with the differential assembly according to the principles of the present disclosure;

FIG. 6A is perspective view of the shroud member and the differential case of the differential assembly of FIG. 4B according to the principles of the present disclosure;

FIG. 7 is a perspective view of an exemplary shroud member according to the principles of the present disclosure; and FIG. 8 is a perspective of the shroud member of FIG. 7 coupled to the differential case according to the principles of the present disclosure.

DESCRIPTION

Figure 1:
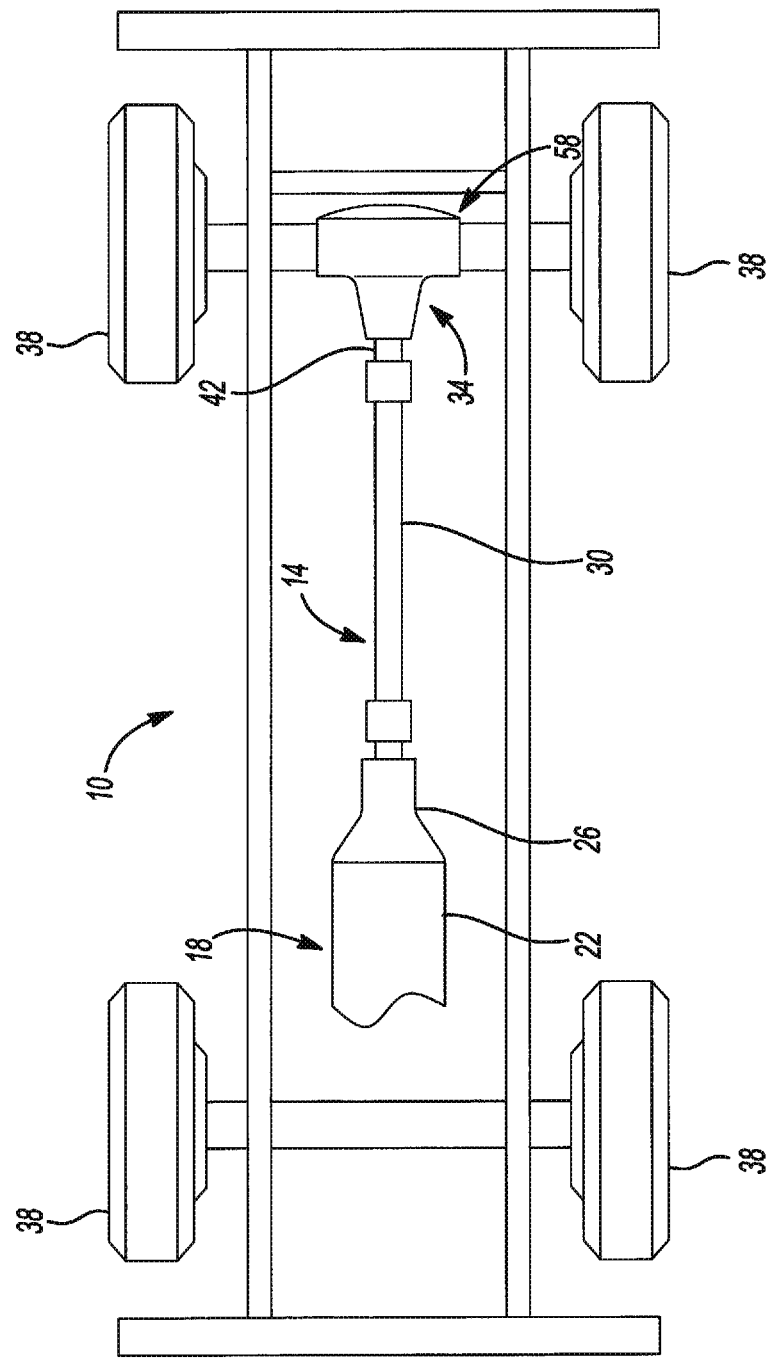
FIG. 1 is a schematic illustration of an exemplary vehicle having an exemplary axle assembly constructed in accordance with the principles of the present disclosure.

With initial reference to FIG. 1, an exemplary vehicle having an axle assembly with a differential assembly configured in accordance with the teachings of the present disclosure is generally indicated by reference numeral 10. The exemplary vehicle includes a driveline 14 operably coupled to an exemplary powertain 18. The powertain 18 includes a prime mover 22, such as an internal combustion engine, and a transmission 26. The driveline 14 also includes a propshaft 30, a rear axle assembly 34 and a plurality of wheels 38. The propshaft 30, in the exemplary vehicle illustrated, couples an output of the transmission 26 to a pinion shaft 42 of the axle assembly 34. The axle assembly 34 includes a differential assembly 50 (FIG. 2) having an exemplary shroud member configured to reduce spin losses of the rear axle assembly 34, as will be discussed below in greater detail.

Turning now to FIGS. 2-4A and with continuing reference to FIG. 1, the axle assembly 34 includes an axle housing assembly 58, the differential assembly 50, the input pinion shaft 42 and a pair of axle shafts 62. In the example illustrated, the axle housing assembly 58 generally includes a carrier housing 66, a cover 70 and a pair of axle tubes 74. The axle housing assembly 58 defines, in the example illustrated, a differential cavity 78 that includes a fluid sump 82 in which a lubricant (for lubricating the differential assembly 50 and pinion shaft 42) is located. The pinion shaft 42 includes a pinion gear 84 that is fixed thereto and drives a ring gear 88 that is fixed to a differential case 92 of the differential assembly 50.

The differential assembly 50, in the example illustrated, includes the ring gear 88, differential case 92 and a differential gear set 96 supported by the differential case 92. In one exemplary implementation, the differential case 92 includes a body 100 and a flange 104. The differential case 92, in one exemplary implementation, is unitarily formed and defines an interior cavity 110 and a pair of windows or apertures 114 to facilitate assembling the differential gear set 96 in the cavity 110, as will be discussed in greater detail below. The ring gear 88 is coupled to the flange 104 and is in meshing engagement with the pinion gear 84.

Figure 2:
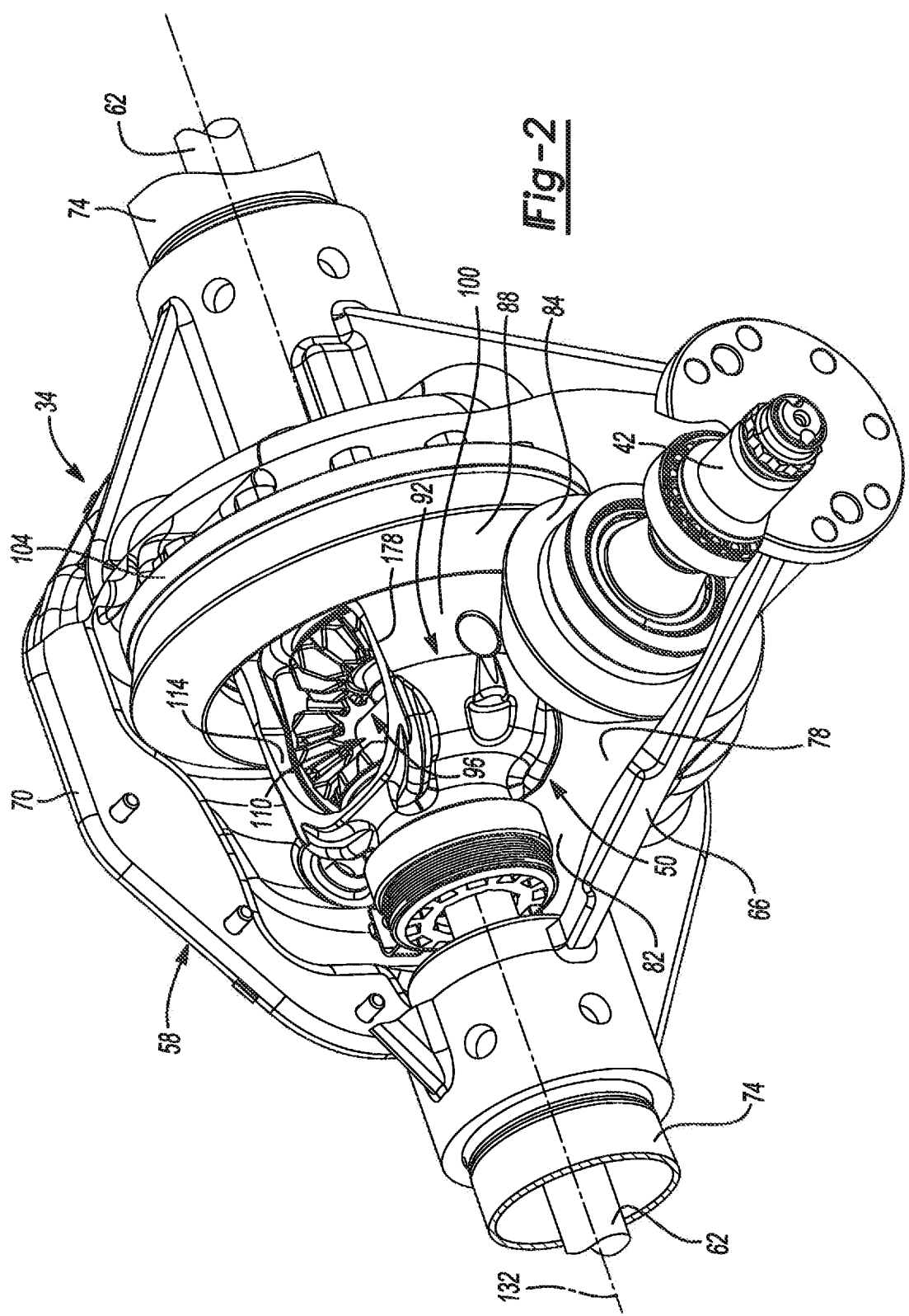
FIG. 2 is a partial broken-away perspective view of a portion of vehicle of FIG. 1 illustrating the rear axle assembly in greater detail according to the principles of the present disclosure.
Figure 4A:
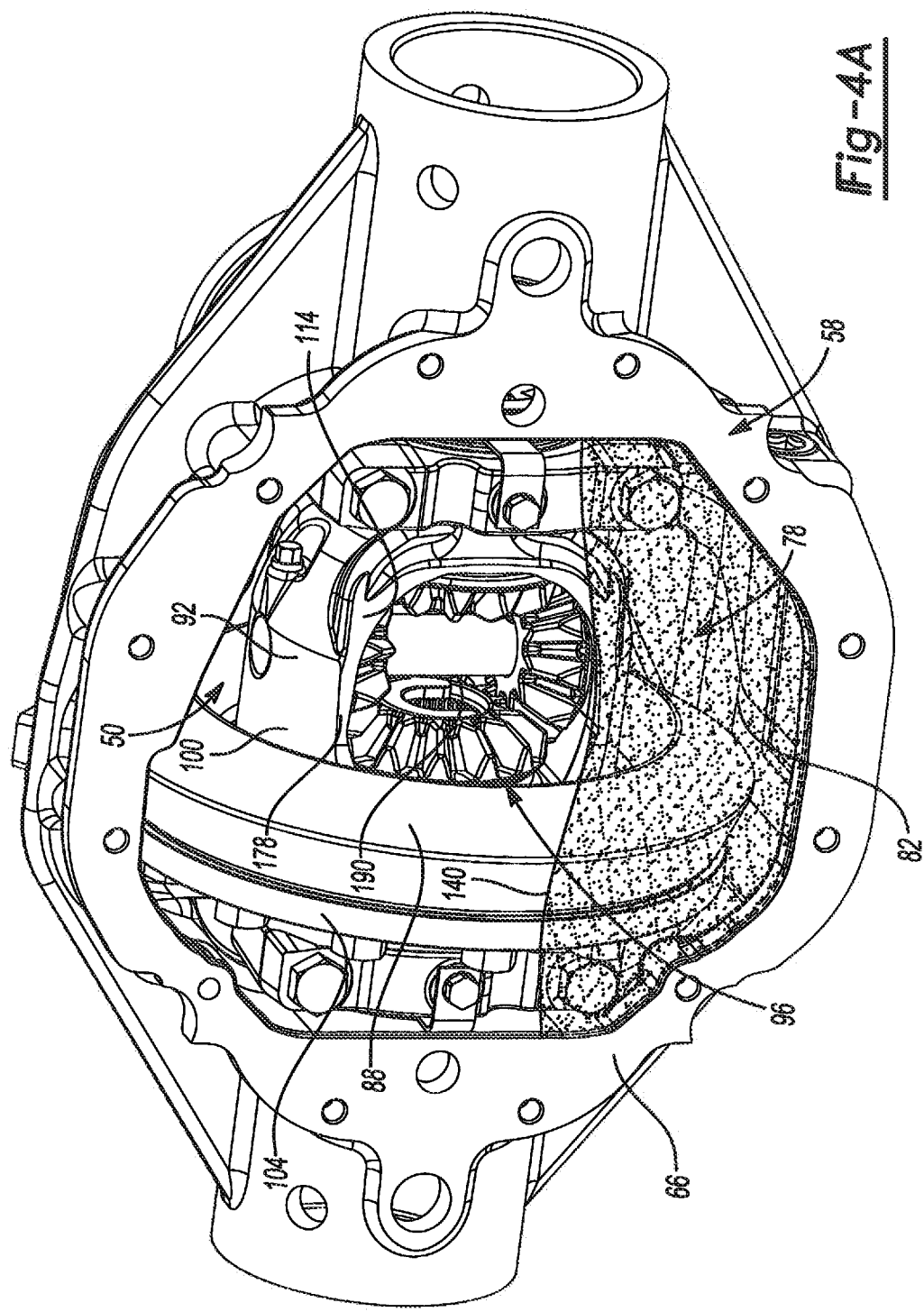
FIG. 4A is a rear perspective view of the axle assembly of FIG. 2 illustrating the carrier housing with the cover removed according to the principles of the present disclosure.

With particular reference to FIG. 3 and continuing reference to FIGS. 1-2 and 4A, the pair of windows 114 formed in or defined by unitary differential case 92 facilitate assembling the components of the differential gear set 96 into the unitary case 92. The differential gear set 96 is assembled into the interior cavity 110 and includes a pair of pinion gears 118 that are meshingly engaged with a pair of side gears 122. A pin 124 is received through the pinion gears 118 and is fixedly coupled to the differential case 92 using various means, such as a threaded fastener 128. Each of the axle shafts 62 are coupled to one of the side gears 122 for rotation therewith. Accordingly, it will be appreciated that rotary power input to the axle assembly 34 via the input pinion 42 is transmitted through the ring gear 88 to the differential case 92 and gear set 96 and output to the axle shafts 62 to provide propulsive torque to the left and right wheels 38.

As will also be appreciated, the differential assembly 50 rotates in the differential cavity 110 about rotational axis 132 as a result of the rotary power input received at the ring gear 88 via the input pinion gear 84. During rotation of the differential assembly 50, lubricant 140 in the sump 82 will cling to portions of the differential assembly 50 as they pass (i.e., rotate) through the lubricant 140 in the sump 82.

Accordingly, the differential assembly 50 of the present disclosure includes a cover or shroud member 150 to cover the apertures 114 of the differential case 92. The shroud members 150, when coupled to the differential case 92, cover the apertures 114 and form a cylindrical or substantially cylindrical external perimeter shape of the differential case. As will be explained in greater detail below, the differential case 92 with shroud members 150 reduce windage losses and churning of lubricant 140 thereby reducing spin losses of axle assembly 34 and increase fuel efficiency of associated vehicle 10.

As can be seen by a comparison of FIGS. 4A and 4B, the differential assembly shown in FIG. 4A without shroud member 150 coupled thereto causes high churning of the differential fluid 140 during rotation thereof in differential cavity 78. Moreover, the uncovered windows 114 cause windage losses during rotation of the differential assembly, especially at higher rotational speeds of the axle assembly 34. As will also be discussed in greater detail below, the shroud members 150 provide for maintaining the windows 114 in the differential case 92 to provide for assembly into and potential service of the differential gear set 96.

Figure 5A:
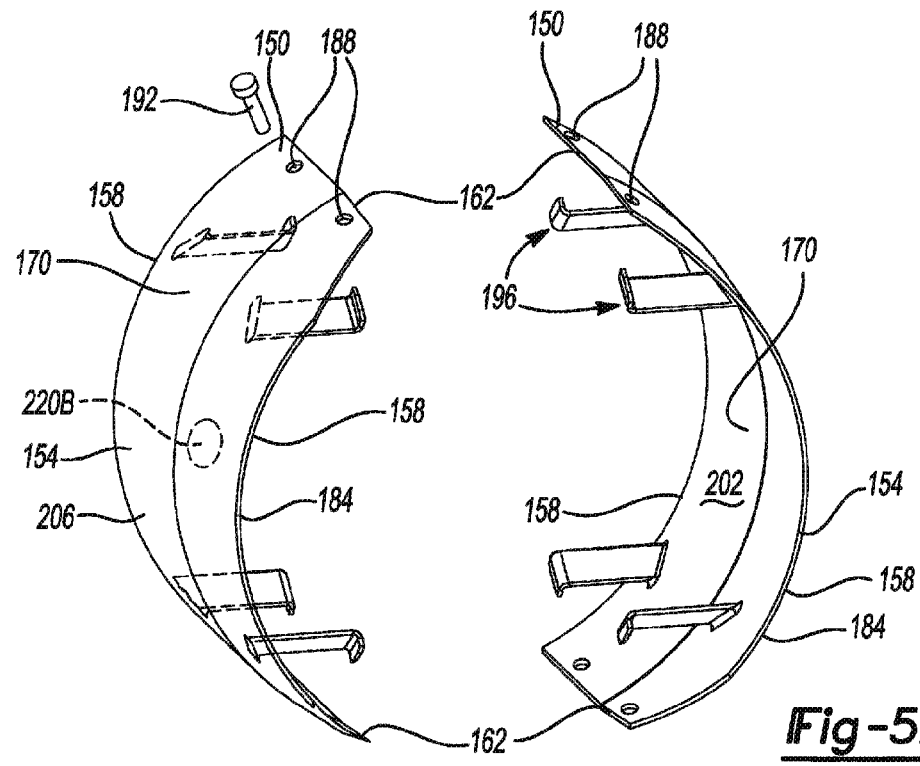
FIG. 5A is a perspective view of one exemplary implementation of the shroud member according to the principles of the present disclosure.
Figure 5B:
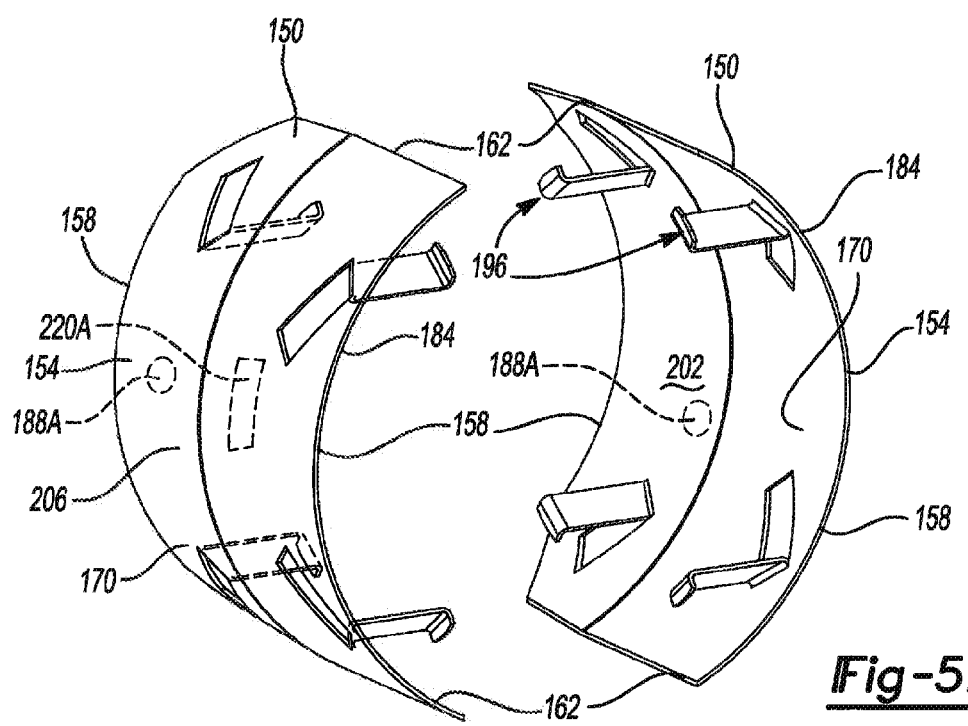
FIG. 5B is a perspective view of one exemplary implementation of the shroud member according to the principles of the present disclosure.
Figure 6B:
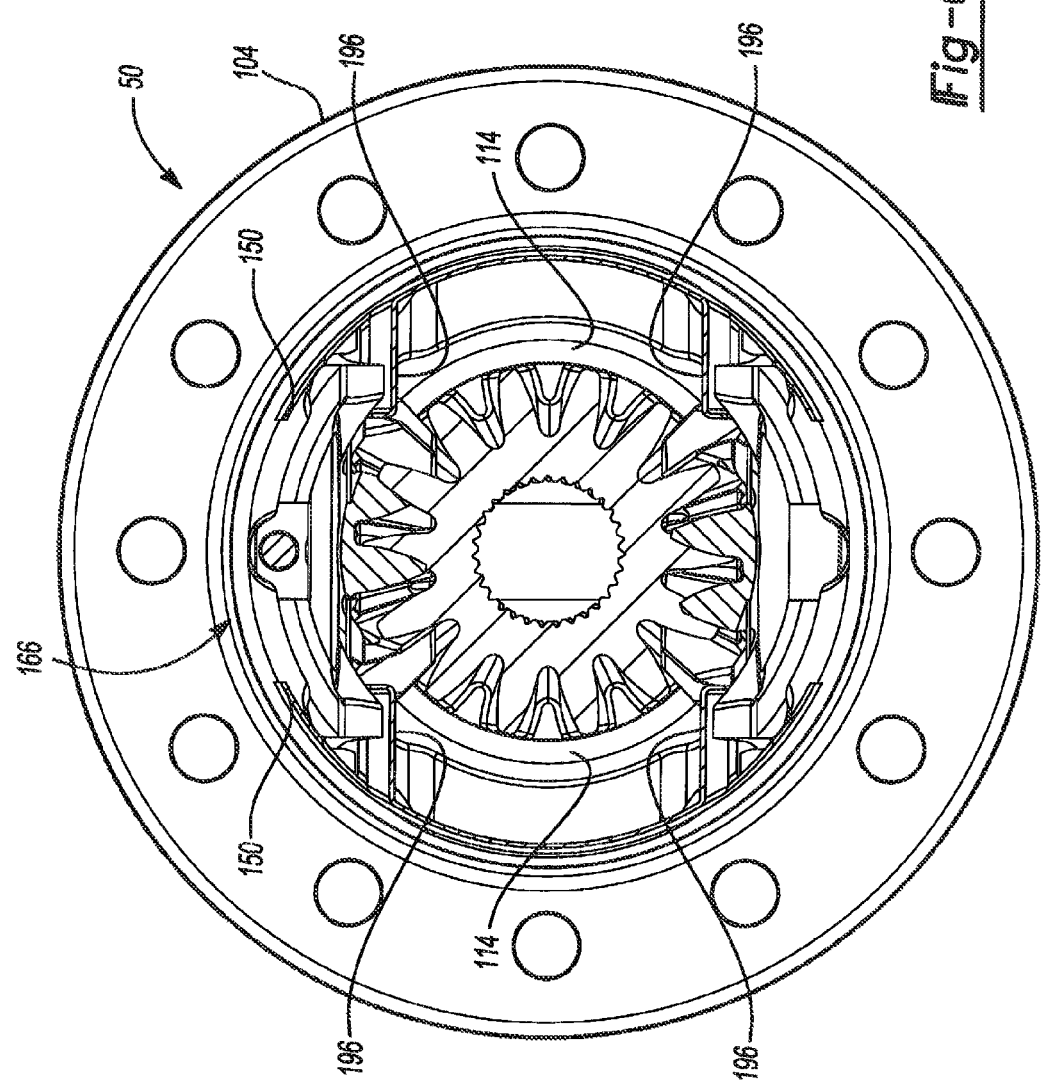
FIG. 6B is a sectional view of the differential assembly case with the shroud member coupled thereto of FIG. 6A according to the principles of the present disclosure.

Turning now to FIGS. 5A-5B, exemplary implementations of the shroud members 150 are shown and will now be discussed in greater detail. The shroud member 150 includes a body 154 defining side gear sides 158 and bevel gear sides 162, with reference to the orientation of the shroud member 150 when removably coupled to the differential assembly 50. As briefly discussed above, the shroud members 150 are configured to be removably coupled to the differential case 92 so as to cover the differential case apertures 114 and, together with the differential case body 100, form a cylindrically shaped or substantially cylindrically shaped outer perimeter 166 of the differential case 92.

In this regard, in the exemplary implementations illustrated, the shroud member 150 includes a curvature or arc-shaped construction 170 between the bevel gear sides 162 so as to continue the cylindrical curvature of the differential case body 100 between the apertures 114. In other words, the shroud members 150 include an outer contour formed by a radius that is the same or substantially the same a radius of the differential case 92. The shroud members 150, in accordance with an aspect of the present disclosure, are sized and shaped to align or substantially align with an outer perimeter 178 of the differential case windows 114. In other words, the shroud members 150 include an outer perimeter 184 that substantially aligns with the outer perimeter 178 of the windows 114.

In one exemplary implementation, the shroud members 150 include the outer perimeter 184 sized and shaped to be slightly larger than the outer perimeter 178 of windows 114. In this implementation, the shroud members 150 include an optional plurality of apertures 188 spaced relative to and around the perimeter thereof for receiving fasteners 192 for removably coupling the shroud members to the differential case 92 and over windows 114. It will be appreciated that while four fastener receiving apertures 188 are shown in FIG. 5A, more or less apertures 188 may be utilized as may be required for different differential case designs. For example, a single fastener can be used to couple one of the shroud members 150 to the other of the shroud members 150 when the shroud members 150 are positioned over the respective windows 114, thereby coupling the shroud members 150 to differential case 92. In this example, each of the shroud members 150 includes an aperture 188A (FIG. 5B) positioned such that a fastener extending through apertures 188A will extend through each window 114 and through the differential case 92 via an open area 190 (FIG. 4A) between the pin 124 and the gears 118, 122.

The shroud member 150 may also include a clip fastener arrangement 196 in addition to or in lieu of the fastener apertures 188 and fasteners 192 for removably coupling the shroud member to the differential case 92. In one exemplary implementation, the clip fastener arrangement 196 is coupled to an interior side 202 of the shroud member 150 opposite an exterior side 206 is configured to releasably engage body 100 of differential case 92 proximate the perimeter 178 of window 114. In this implementation, the clip fastener arrangement 196 can engage a perimeter edge 210 (FIG. 3) and/or an interior side 214 (FIG. 3) of the differential case housing 100 proximate the perimeter 178 of window 114 In one exemplary implementation, the shroud member 150 includes four clip fastener arrangements 196, one at each of the side gear sides 158 and bevel gear sides 162 for removably securing the shroud member 150 to the differential case 92. In these implementations, the clip fastener arrangements can be integrally formed with the associated shroud member 150. For example, for a polymeric shroud member 150, the clip fastener arrangements 196 can be integrally molded with the polymeric shroud member 150. In an exemplary implementation utilizing an aluminum or steel sheet metal shroud member 150, the clip fastener arrangements 196 can be formed from the housing material itself.

The shroud member 150 can be formed from various materials, such as polymers or aluminum. The shroud member 150 is formed as a unitary component and can, in one exemplary implementation, include or define one or more lubrication apertures 220 in the body 154 thereof. The lubrication apertures 220 can be positioned to provide a controlled or predetermined amount of lubricant through the shroud member 150 and associated window 114 to the differential gear set 96. Example lubrication apertures 220 are shown in broken lines in FIGS. 5A and 5B and may vary in number and location as determined for each differential assembly and axle assembly the shroud members 150 are associated with. In the examples illustrated, the lubrication apertures 220A comprise an oblong shape with a longitudinal axis perpendicular to the rotational axis and lubrication apertures 220B comprise a circular or substantially circular shape.

In operation, the shroud members 150 are removably coupled to the differential case 92 to cover the pair of windows 114 in the manner discussed above. The differential shroud members 150 can be coupled to the differential assembly at the time of manufacturing the axle assembly, during service of the axle assembly or at another time after the differential gear set 96 is assembled into the differential case 92. The differential shroud members 150, when coupled to the differential case 92, cover the windows 114 therefore providing a more uniform exterior of the differential assembly 50. In other words, the differential shroud members 150 together with the differential housing 100 provide, in one exemplary implementation, a cylindrical or substantially cylindrical shaped exterior of the differential case 92. This resultant cylindrically shaped differential case more efficiently rotates through the differential fluid 140 in sump 82, thereby reducing fluid churning losses. Moreover, the differential assembly 50 with shroud members 150 reduces windage losses during rotation thereof by having the shroud members cover the case openings 114. As a result, operation of the axle assembly 34 with the differential assembly 50 having shroud members 150 coupled thereto reduces the spin losses thereby improving the overall operating efficiency of the axle assembly.

Turning now to FIGS. 7-8 and with continuing reference to FIGS. 1-6B, an exemplary shroud member 150A is shown and will now be discussed, where like reference numerals refer to like or similar features as shroud member 150. In one exemplary implementation, shroud member 150A includes a flexible clamshell housing 250 having ring gear end 254, an opposed bearing shoulder end 258, and clamshell ends 262. In this implementation, the housing 250 defines an internal area 268 and is flexible so as to be opened at the circumferential clamshell ends 262 to receive the differential case in internal area 268. Once positioned around the differential case 92, the housing 250 is sized and shaped to have a diameter substantially similar to the diameter of the differential case 92 such that the clamshell ends 262 contact or substantially contact each other when encircling the differential case 92. For example, the shroud member 150A, when coupled to the differential case 92, includes the same or substantially the same radius as the differential case 92 and the same radiused or cylindrical contour as the differential case 92 between the windows 114.

The housing 250 also includes a longitudinal length sized such that, when coupled to the differential case 92, the ring gear end 254 is proximate to or engages the ring gear 88 or flange 104 and the bearing shoulder end 258 is proximate to a bearing shoulder area 274 of differential case 92 such that the housing 250 covers windows 114 and a majority of the exterior of the differential case 92. In one exemplary implementation, the bearing shoulder end 258 of differential case 92 contacts and/or encircles a bearing shoulder area 274 of differential case 92. A removable band or retention device 284 secures the shroud member 150A to the differential case 92, as shown for example in FIG. 8. The housing 250 of shroud member 150A can also define lubrication apertures 220 in the same or similar manner as discussed above for shroud member 150.

In operation, the shroud member 150A encircles or substantially encircles the differential case 92 from the ring gear 88 and/or flange 104 to the opposed bearing shoulder area 274, thereby providing a smooth, uniform surface that will rotatably contact the lubricant 140 associated with sump 82. As a result, churning of lubricant 140 is reduced along with windage losses, thereby reducing spin losses of axle assembly 34 in the same or similar manner as shroud member 150 discussed above. This, in turn, increases the efficiency of axle assembly 34.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An axle assembly for a vehicle, the axle assembly comprising:
   an axle housing assembly including a carrier housing; and
   a differential assembly mounted in the carrier housing for rotation about a rotational axis, the differential assembly including a unitary differential case, a differential gear set and a shroud member, the differential case defining an interior cavity and a window having an outer perimeter, the window configured to provide access to the interior cavity for assembling the gear set into the interior cavity;
   wherein the shroud member is configured to be removably coupled to the differential case to cover the window and provide a radiused contour aligning with a radiused contour of the differential case thereby reducing spin losses when the differential assembly is rotating relative to the axle housing assembly.

2. The axle assembly of claim 1, wherein the window defined by the differential case includes a pair of windows defined by the differential case, and the shroud member includes a pair of distinct shroud members configured to be removably coupled to the differential case to cover the pair of windows.

3. The axle assembly of claim 2, wherein each shroud member of the pair of shroud members includes an outer perimeter, the outer perimeter of each shroud member configured to substantially align with the outer perimeter of each window.

4. The axle assembly of claim 2, wherein each shroud member of the pair of shroud members is coupled to the differential case about a respective window of the pair of windows such that the shroud members are circumferentially spaced apart from each other.

5. The axle assembly of claim 4, wherein each shroud member of the pair of shroud members includes an outer perimeter that overlaps the outer perimeter of each respective window.

6. The axle assembly of claim 2, wherein the differential case, with the pair of shroud members coupled thereto, includes a cylindrical exterior contour, the cylindrical exterior contour configured to reduce lubricant churning and windage losses when the differential assembly is rotating relative to the axle housing assembly.

7. The axle assembly of claim 2, wherein each shroud member comprises integral coupling members configured to engage the differential case about the respective window to removably couple the shroud members to the differential case.

8. The axle assembly of claim 2, wherein each shroud member defines a lubricant aperture configured to provide for a controlled amount of lubrication to flow through each shroud member and respective window to the differential gear set.

9. The axle assembly of claim 2, wherein each shroud member includes a longitudinal length sized and shaped to cover the respective window such that each shroud member extends substantially from a ring gear end of the differential case to an opposed bearing shoulder end of the differential case.

10. The axle assembly of claim 1, wherein the shroud member comprises an annular clamshell shroud member defining a cylindrical exterior contour when in a closed configuration.

11. The axle assembly of claim 10, wherein the clamshell shroud member comprises a flexible housing defining opposed circumferential ends, and wherein the circumferential ends are configured to be spaced apart from each other in an open configuration of the clamshell shroud member so as to receive the differential case in an interior of the clamshell shroud member.

12. The axle assembly of claim 11, wherein the clamshell shroud member comprises, in the closed configuration, a diameter complimentary to a diameter of the differential case so as to encircle the differential case when coupled thereto and provide the cylindrical exterior contour for the differential case.

13. The axle assembly of claim 12, further comprising a coupling member configured to maintain the clamshell shroud member in the closed configuration about the differential case.

14. The axle assembly of claim 13, wherein the clamshell shroud member defines a lubricant aperture configured to provide for a controlled amount of lubrication to flow through the clamshell shroud member and window to the differential gear set.

15. The axle assembly of claim 12, wherein the differential case, with the clamshell shroud member removably coupled thereto, provides the cylindrical exterior contour that is configured to reduce lubricant churning and windage losses when the differential assembly is rotating relative to the axle housing assembly.

* * * * *